United States Patent
Xu et al.

(10) Patent No.: US 11,451,809 B2
(45) Date of Patent: Sep. 20, 2022

(54) METHOD AND APPARATUS FOR VIDEO CODING

(71) Applicant: Tencent America LLC, Palo Alto, CA (US)

(72) Inventors: Xiaozhong Xu, State College, PA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/912,223

(22) Filed: Jun. 25, 2020

(65) Prior Publication Data

US 2021/0067790 A1 Mar. 4, 2021

Related U.S. Application Data

(60) Provisional application No. 62/892,918, filed on Aug. 28, 2019.

(51) Int. Cl.

| H04N 19/44 | (2014.01) |
|---|---|
| H04N 19/105 | (2014.01) |
| H04N 19/132 | (2014.01) |
| H04N 19/176 | (2014.01) |
| H04N 19/159 | (2014.01) |
| H04N 19/186 | (2014.01) |

(52) U.S. Cl.
CPC ........... *H04N 19/44* (2014.11); *H04N 19/105* (2014.11); *H04N 19/132* (2014.11); *H04N 19/159* (2014.11); *H04N 19/176* (2014.11); *H04N 19/186* (2014.11)

(58) Field of Classification Search
None
See application file for complete search history.

(56) References Cited

U.S. PATENT DOCUMENTS

| 6,052,415 A * | 4/2000 | Carr ..................... H04N 19/89 |
| | | 375/E7.279 |
| 2018/0014011 A1* | 1/2018 | He ........................ H04N 19/105 |
| 2020/0112741 A1* | 4/2020 | Han ...................... H04N 19/577 |
| 2020/0120339 A1* | 4/2020 | Chiang ................ H04N 19/159 |
| 2020/0137398 A1* | 4/2020 | Zhao .................... H04N 19/176 |
| 2020/0186825 A1* | 6/2020 | Rusanovskyy ...... H04N 19/105 |

(Continued)

OTHER PUBLICATIONS

Shan Liu, et al., "Overview of HEVC extensions on screen content coding", SIP, the Authors, http://creativecommons.org/licensesby/4.0/ vol. 4, e10, 2015, 12 pages.

(Continued)

*Primary Examiner* — Talha M Nawaz
(74) *Attorney, Agent, or Firm* — Arentfox Schiff LLP

(57) ABSTRACT

An apparatus for video decoding includes processing circuitry. The processing circuitry can be configured to receive data of a current block coded with an intra block copy (IBC) mode in a bitstream. A block vector of the current block can be determined based on a history-based block vector prediction (HBVP) table that includes one or more entries each corresponding to a previously decoded block. Each entry can include a block vector of the corresponding previously decoded block and a location of the corresponding previously decoded block. The current block can be reconstructed based on the determined block vector of the current block.

20 Claims, 12 Drawing Sheets

(56) References Cited

U.S. PATENT DOCUMENTS

| | | | | |
|---|---|---|---|---|
| 2020/0275093 | A1* | 8/2020 | Lin | H04N 19/159 |
| 2020/0404320 | A1* | 12/2020 | Zhang | H04N 19/52 |
| 2020/0413044 | A1* | 12/2020 | Zhang | H04N 19/70 |
| 2021/0014524 | A1* | 1/2021 | Rusanovskyy | H04N 19/176 |
| 2021/0092432 | A1* | 3/2021 | Rusanovskyy | H04N 19/176 |

OTHER PUBLICATIONS

Jizheng Xu, et al., "Bitstream conformance with a virtual IBC buffer concept", Joint Video Experts Team (JVET) of ITU-T SG 16 WP 3 and ISO/IEC JTC 1/SC 29/WG 11, 15th Meeting, Document: JVET-O1170-v1, Jul. 3-12, 2019, 8 pages.

Xiaozhong Xu, et al., "CE8-related: Unified intra block copy block vector prediction", Joint Video Experts Team (JVET) of ITU-T SG 16 WP 3 and ISO/IEC JTC 1/SC 29/WG 11, 14th Meeting, Document: JVET-N0382v2, Mar. 19-27, 2019, 11 pages.

Benjamin Bross, et al., "Versatile Video Coding (Draft 3)", Joint Video Experts Team (Jvet), of ITU-T SG 16 WP 3 and ISO/IEC JTC 1/SC 29/WG 11, 12th Meeting, Document: JVET-L1001v7, Oct. 3-12, 2018, 225 pages.

Xiaozhong Xu, et al., "CE8-related: CPR mode with local search range optimization", Vjoint Video Experts Team (JVET) of ITU-T SG 16 WP 3 and ISO/IEC JTC 1/SC 29/WG 11, 12th Meeting, Document: JVET-L0297-v1, Oct. 3-12, 2018, 6 pages.

Xiaozhong Xu, et al., "CE8: CPR mode with local search ranges (Test CE8.3.1 and CE8.3.2)", Joint Video Experts Team (JVET) of ITU-T SG 16 WP 3 and ISO/IEC JTC 1/SC 29/WG 11, 12th Meeting, Document: JVET-L0293v2, Oct. 3-12, 2018, 5 pages.

Rajan Joshi, et al., "High Efficiency Video Coding (HEVC) Screen Content Coding: Draft 6", Joint Collaborative Team on Video Coding (JCT-VC) of ITU-T SG 16 WP 3 and ISO/IEC JTC 1/SC 29/WG 11, 23rd Meeting, Document: JCTVC-W1005v4, Feb. 19-26, 2016, 683 pages.

Xiaozhong Xu, et al., "Intra Block Copy in HEVC Screen Content Coding Extensions", IEEE Journal on Emerging and Selected Topics in Circuits and Systems, 2016, 11 pages.

* cited by examiner

METHOD AND APPARATUS FOR VIDEO CODING

INCORPORATION BY REFERENCE

This present disclosure claims the benefit of U.S. Provisional Application No. 62/892,918, "History Based Block Vector Prediction for Intra Picture Block Compensation" filed on Aug. 28, 2019, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry. The processing circuitry can be configured to receive data of a current block coded with an intra block copy (IBC) mode in a bitstream. A block vector of the current block can be determined based on a history-based block vector prediction (HBVP) table that includes one or more entries each corresponding to a previously decoded block. Each entry can include a block vector of the corresponding previously decoded block and a location of the corresponding previously decoded block. The current block can be reconstructed based on the determined block vector of the current block. In an embodiment, the block vector, a location, a width, and a height of the current block is stored in the HBVP table.

Further, each entry can include an x coordinate and y coordinate of a corner of the corresponding previously decoded block. In a further embodiment, each entry can include one of corner positions of the corresponding previously decode block, and a width and a height of the corresponding previously decoded block.

In an embodiment, the circuitry can be configured to construct a block vector prediction (BVP) candidate list based on the HBVP table. The BVP candidate list can include one or more of a first candidate and a second candidate. The first candidate can include a first block vector of the block vectors in the HBVP table. The corresponding previously decoded block of the first block vector has a location to the left of the current block. The second candidate can include a second block vector of the block vectors in the HBVP table. The corresponding previously decoded block of the second block vector has a location on top of the current block.

The circuitry is configured to classify the entries in the HBVP table into different groups each stored in a classification HBVP table. In an example, one of the entries of the HBVP table is stored into one of the classification HBVP tables when a size of the corresponding previously decoded block of the one of the entries of the HBVP table satisfies a block size condition. The block size condition can be that a number of luma samples of the corresponding previously decoded block of the one of the entries of the HBVP table is larger than or equal to a threshold.

In a further example, the entries in the HBVP table are classified into the classification HBVP tables based on an x coordinate, a y coordinate, or a combination of the x and y coordinates of each of the corresponding previously decoded blocks stored in the HBVP table.

In an embodiment, an index indicating one of the classification HBVP tables is received. One entry is selected from the indicated classification HBVP tables that correspond to to the most recently decoded block among the previously decoded blocks of the one or more entries in the indicated classification HBVP tables. The block vector of the selected one entry is used as a block vector predictor of the block vector of the current block.

In an embodiment, a BVP candidate list is constructed. The BVP candidate list includes one or more BVP candidates that each include a block vector selected from the classification HBVP tables. A BVP candidate can be selected from the BVP candidate list to be a block vector predictor of the block vector of the current block based on an index received from the bitstream. In various embodiments, the current block can be coded in one of a skip mode, a merge mode, or an advanced motion vector prediction (AMVP) mode.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

I. Video Coding Encoder and Decoder

Figure 1:
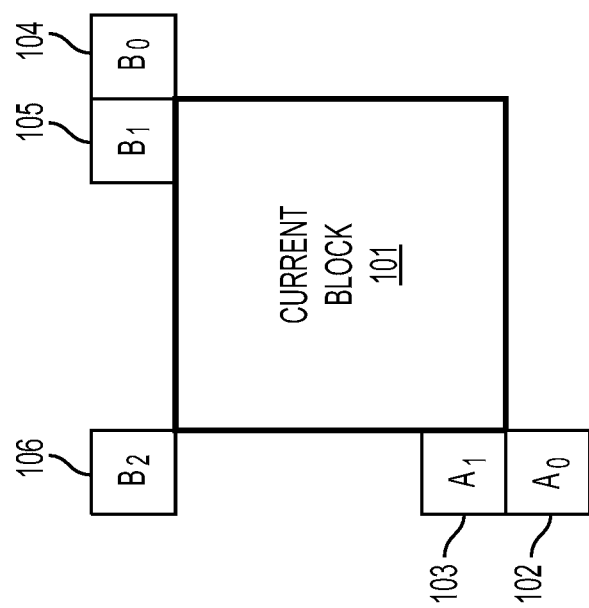
FIG. 1 is a schematic illustration of a current block and its surrounding spatial merge candidates in one example.
Figure 2:
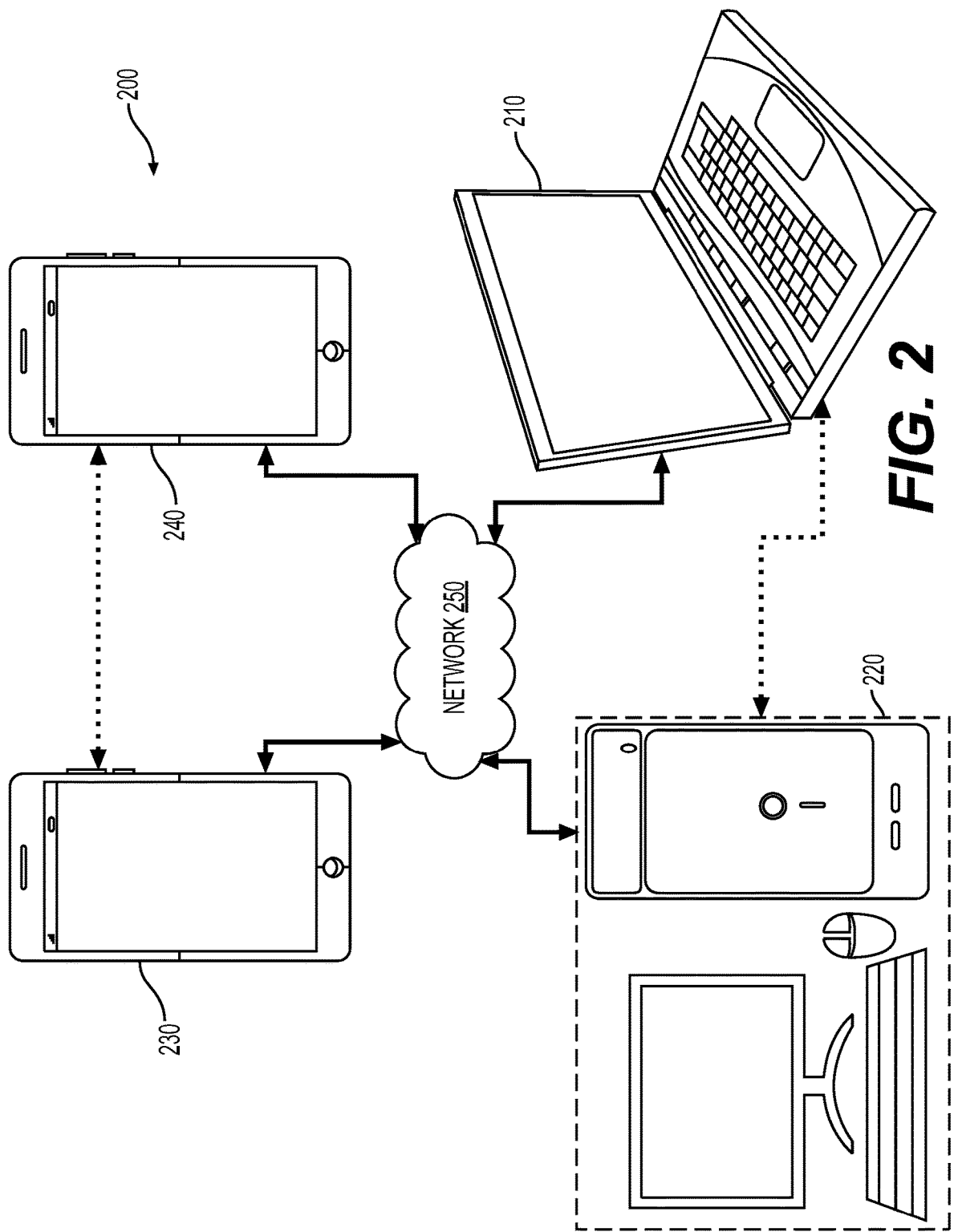
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
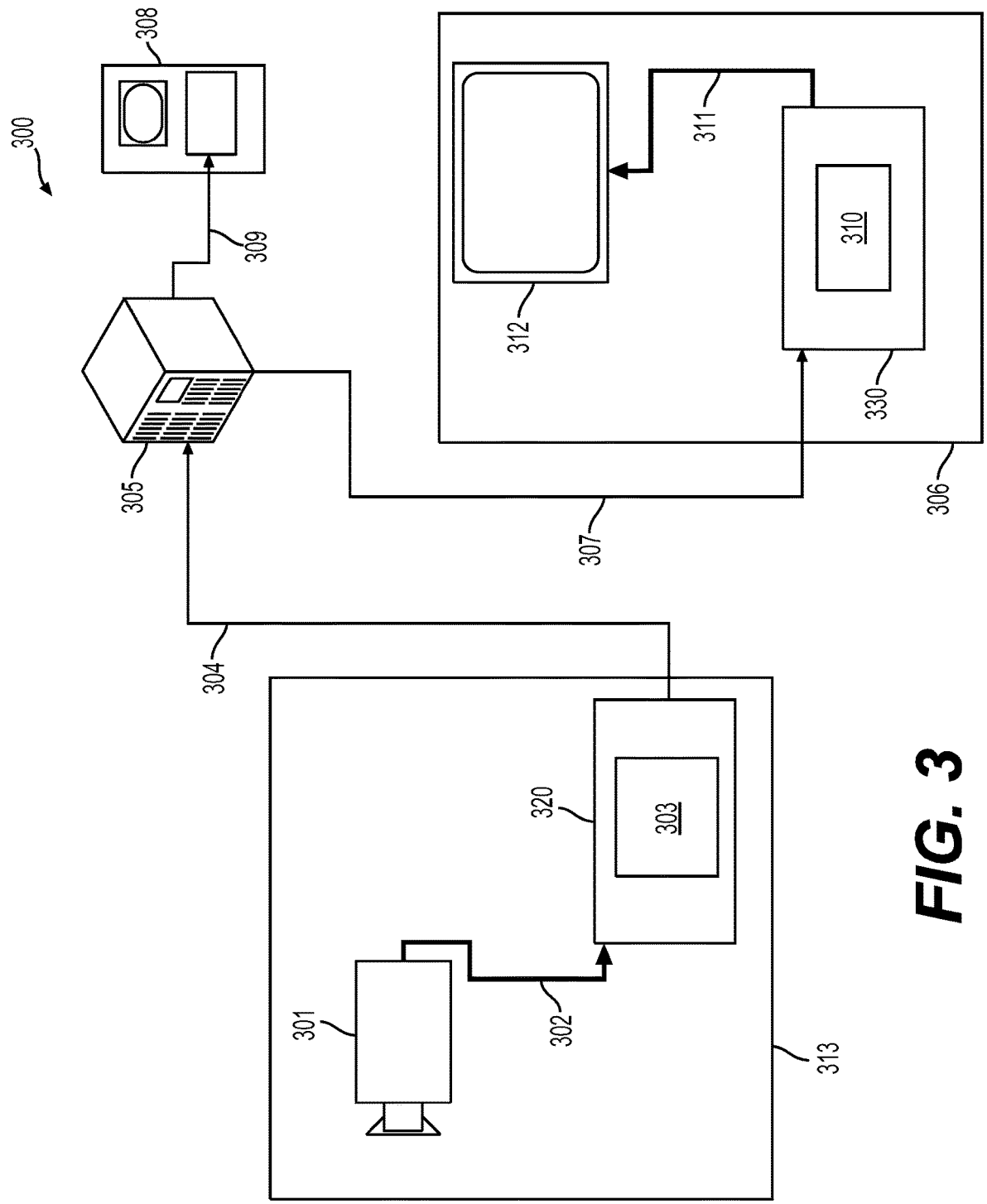
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
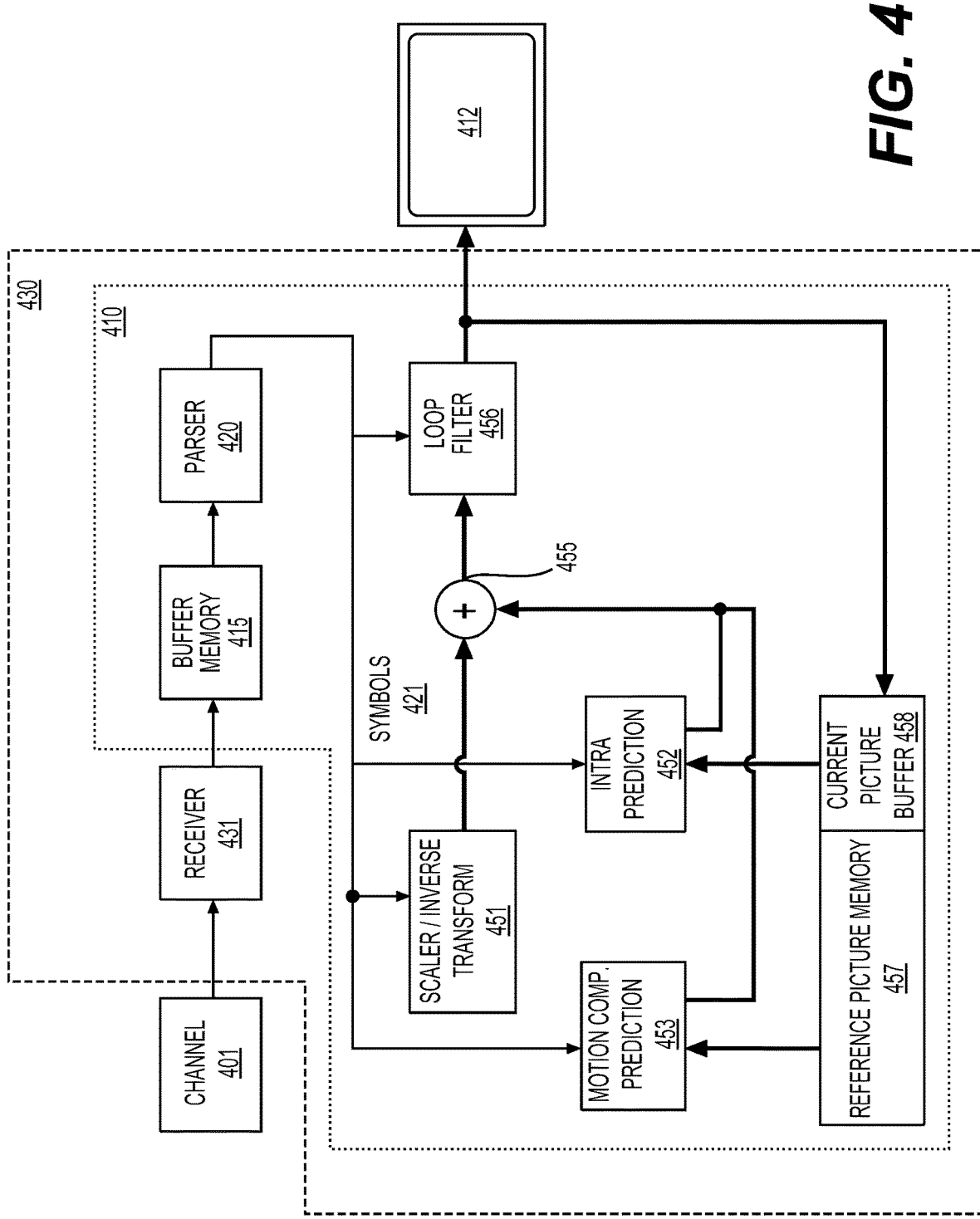
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
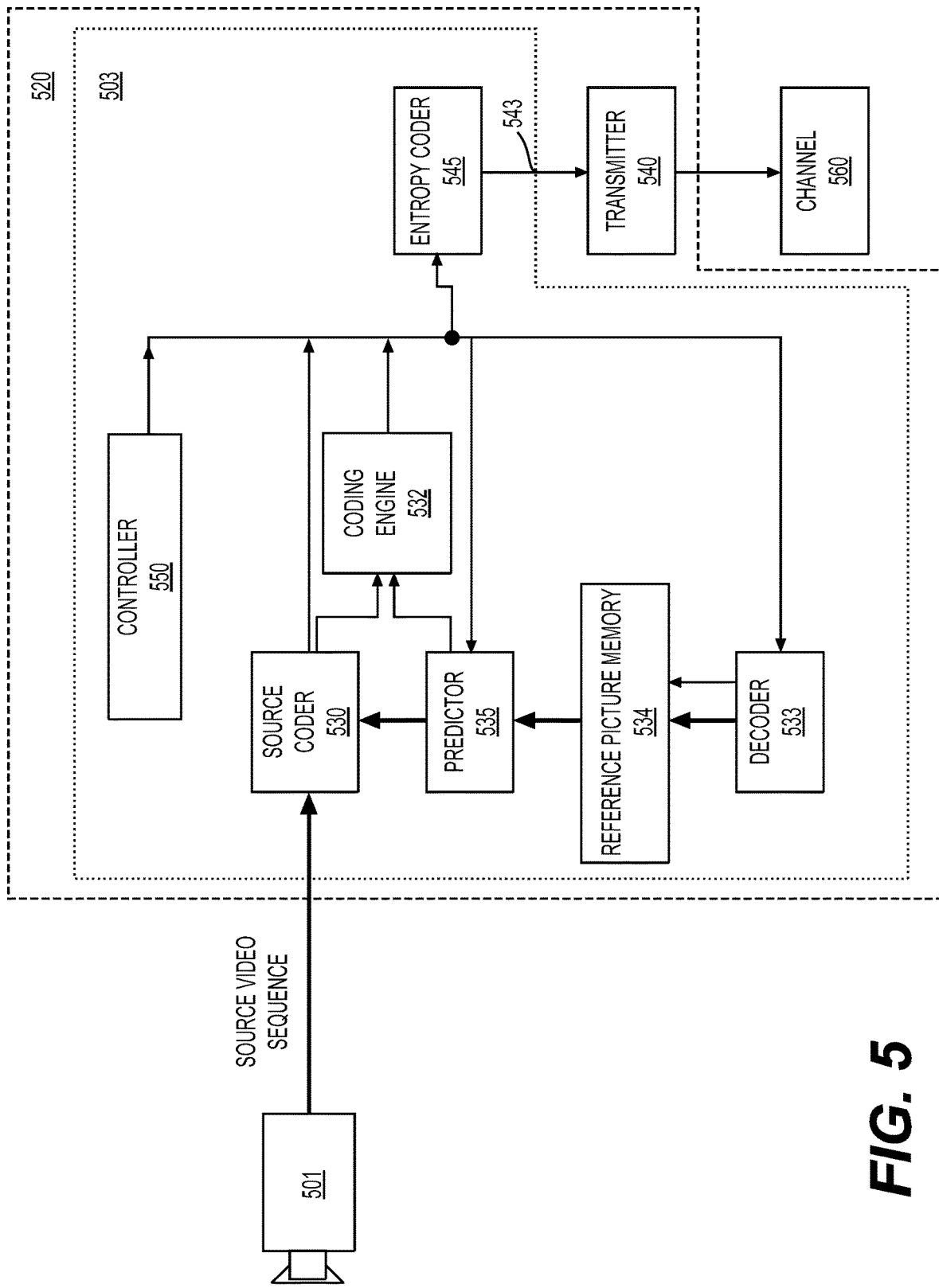
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously coded picture from the video sequence that were designated as "reference pictures." In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
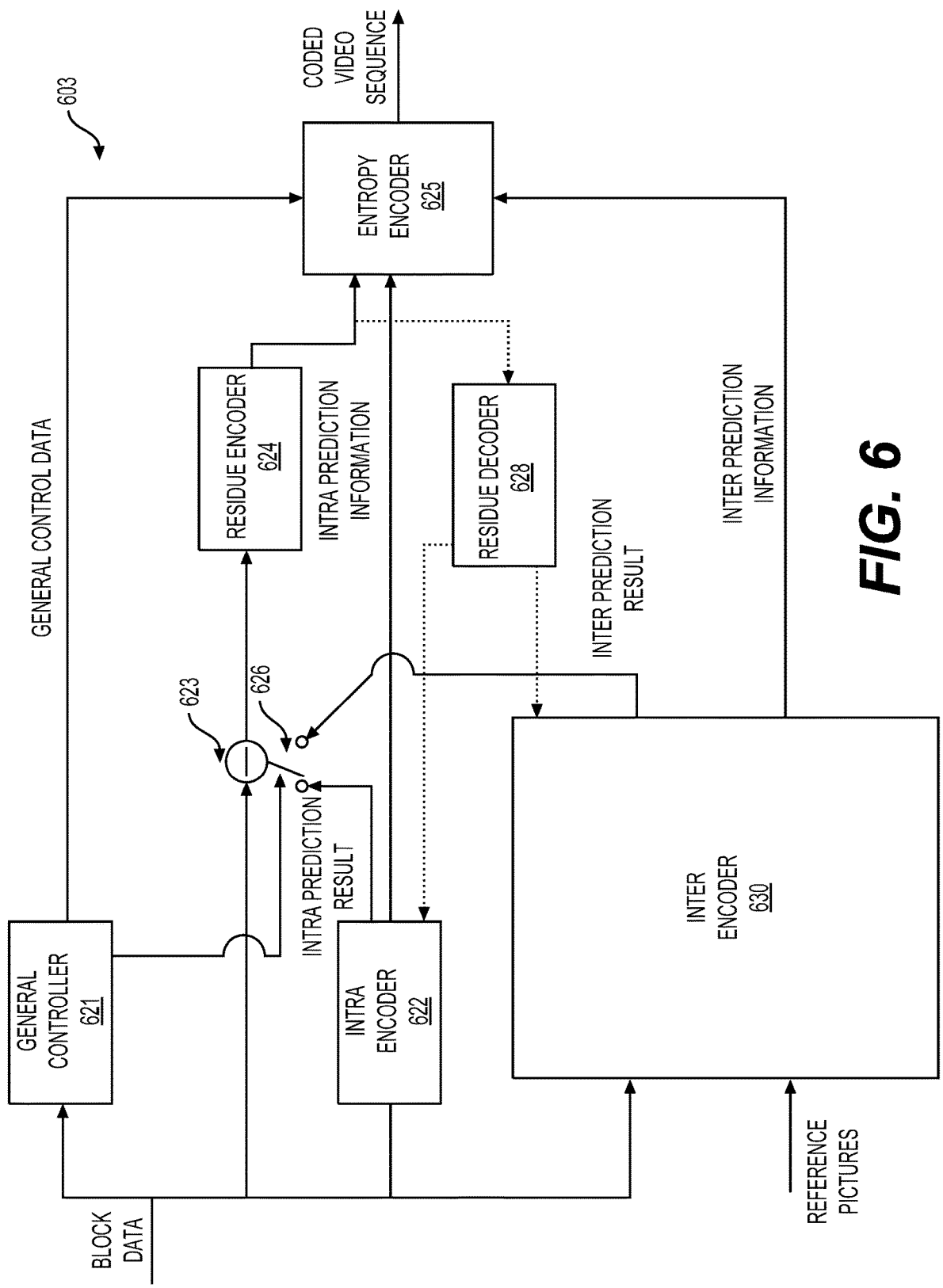
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603)

includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
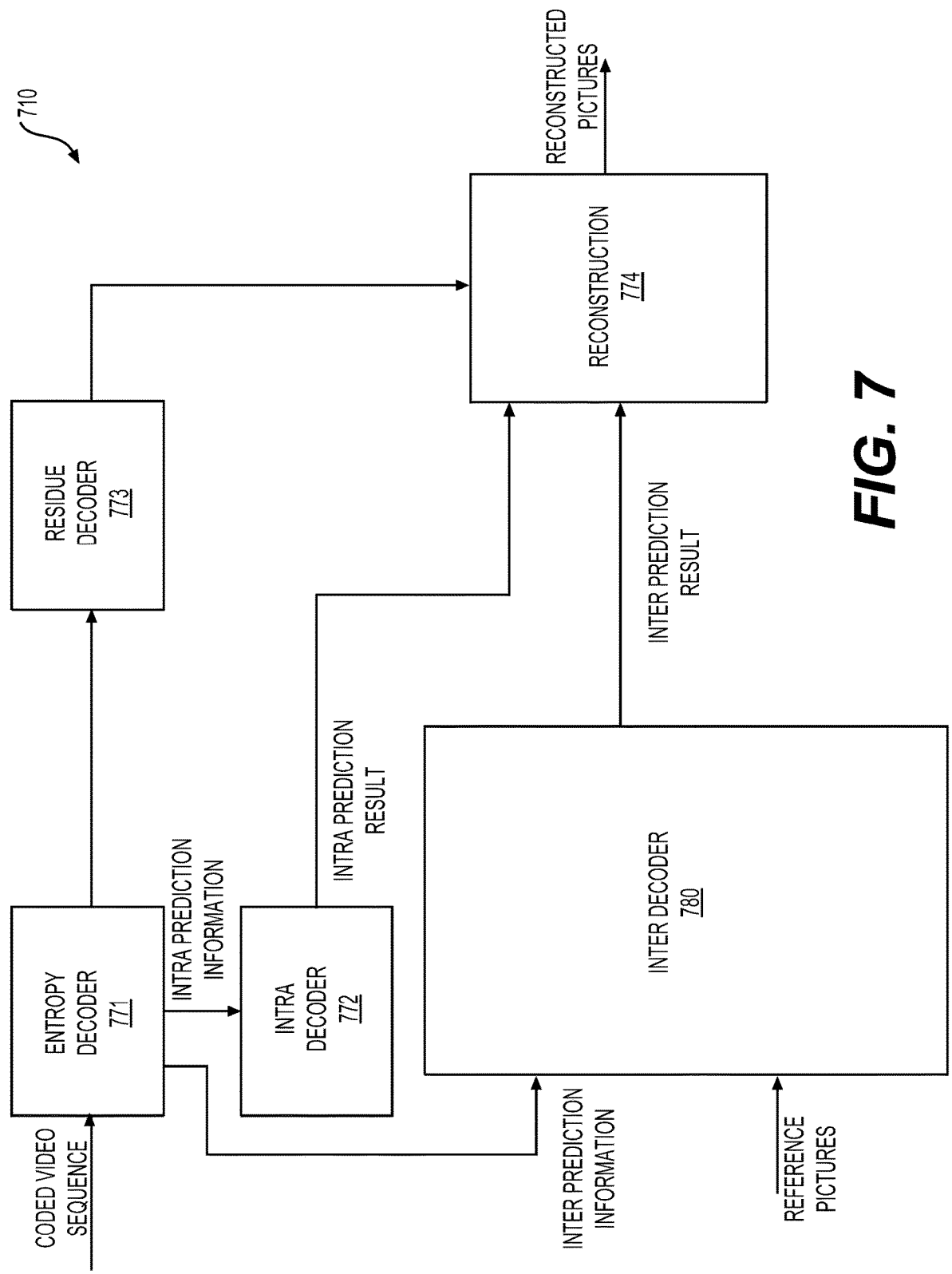
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

II. Intra Block Copy

For hybrid block based video coding, motion compensation from a different picture (inter picture motion compensating) is well known. Similarly, motion compensation can also be performed from a previously reconstructed area within the same picture. This is referred to as intra picture block compensation, current picture referencing (CPR), or intra block copy (IBC). In IBC, a displacement vector that indicates an offset between a current block and a reference block is referred to as a block vector (BV). Different from a motion vector in motion compensation from a different picture, which can be at any value (positive or negative, at either x or y direction), a block vector has a few constraints such that it is ensured that the pointed reference block is available and already reconstructed. Also, for parallel processing consideration, some reference area that is a tile boundary or a wavefront ladder shape boundary is also excluded for IBC.

The coding of a block vector can be either explicit or implicit. In the explicit mode (or referred to as advanced motion vector prediction (AMVP) mode in inter coding), the difference between a block vector and its predictor is signaled; in the implicit mode, the block vector is recovered purely from its predictor, in a similar way as a motion vector obtained in merge mode. The resolution of a block vector, in some implementations, is restricted to integer positions; in other systems, it may be allowed to point to fractional positions.

In an embodiment, the use of IBC at block level can be signaled using a block level flag, referred to as an IBC flag. In an example, the IBC flag is signaled when the current block is not coded in merge mode. In another example, the use of IBC can be signaled by a reference index approach, and the current decoded picture is treated as a reference picture. For example, in HEVC Screen Content Coding (SCC), such a reference picture is put in the last position of a reference picture list. This special reference picture is also managed together with other temporal reference pictures in a decoded picture buffer (DPB).

There are also some variations for IBC, such as treating the IBC as a third mode, which is different from either intra or inter prediction mode. By doing this, the block vector prediction in merge mode and AMVP mode for IBC are separated from regular inter mode. For example, a separate merge candidate list is defined for IBC mode, where all the entries in the list are all block vectors. Similarly, the block vector prediction list in IBC AMVP mode consists of block vectors. The general rules applied to both lists are: the rules may follow the same logic as inter merge candidate list or AMVP predictor list in terms of candidate derivation process. For example, the 5 spatial neighboring locations (shown in FIG. 10) in HEVC or VVC inter merge mode are accessed to derive a merge candidate list for IBC.

Figure 8:
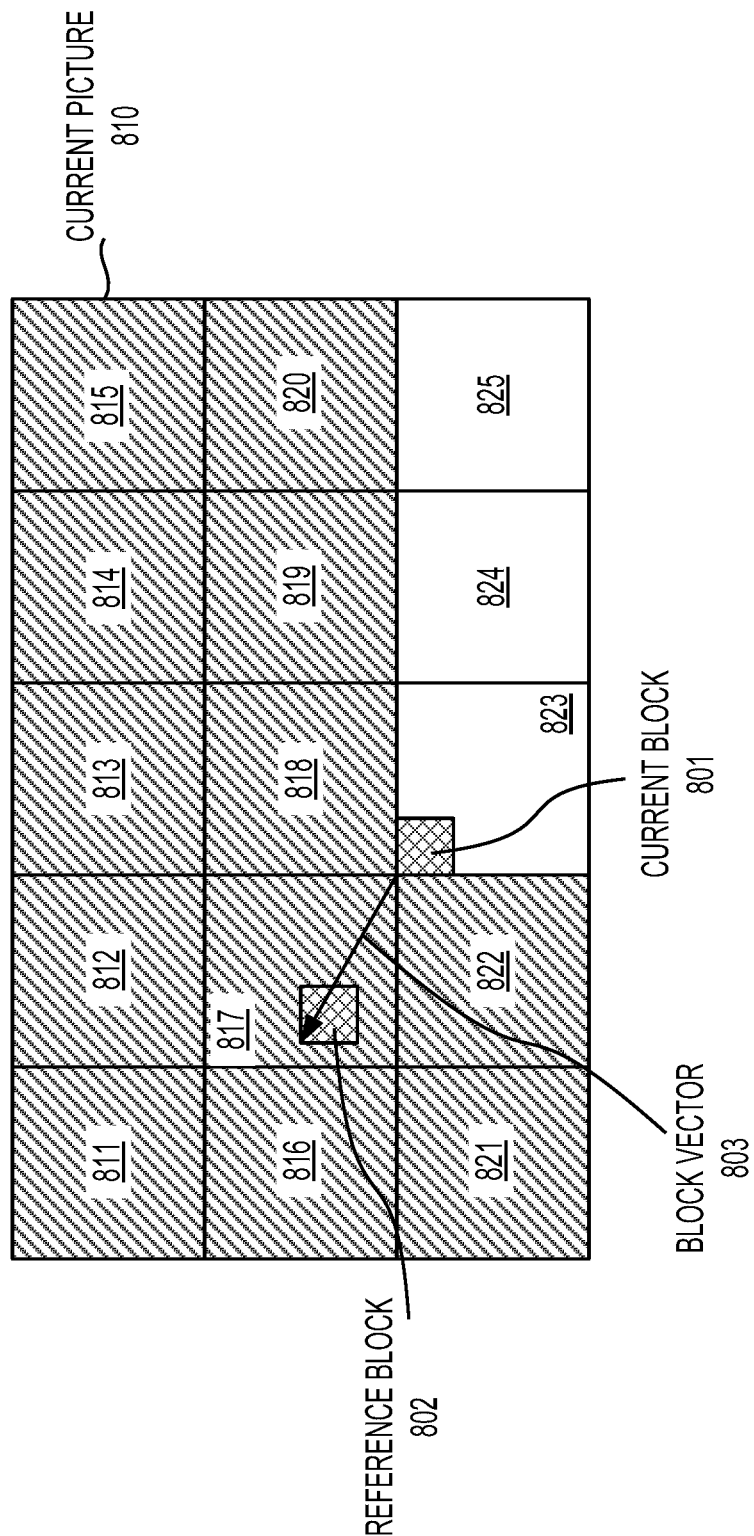
FIG. 8 shows an example of intra picture block compensation.

FIG. 8 shows an example of intra picture block compensation. A picture (810) under processing (referred to as a current picture) is partitioned into CTUs (811-825). The CTUs (811-822) have been decoded. The current CTU (823) is under processing. To decode a IBC-coded current block (801) in the current CTU (823), a block vector (803) can first be determined. Based on the block vector (803), a reference block (802) (also referred to as a prediction block or a predictor block) in the CTU (817) can be located. Accordingly, the current block (801) can be reconstructed by combining the reference block (802) with a residual of the current block (801). As shown, the reference block (802) and the current block (801) reside in the same current picture (810).

FIGS. 9A-9D show an example of intra picture block compensation with a one-CTU-size memory for storing reconstructed samples. In a first example, a search range of an IBC mode can be constrained to be within a current CTU. Thus, an effective memory requirement to store reference samples for the IBC mode is one CTU size of samples. As an example, a 128×128 current CTU can be partitioned into four 64×64 regions. Considering the existing reference sample memory to store reconstructed samples in a current 64×64 region, 3 more 64×64 sized reference sample memory are required. Based on this fact, in a second example, an effective search range of the IBC mode can be extended to some part of the left CTU while the total memory requirement for storing reference pixels are kept unchanged (1 CTU size, 4 64×64 reference sample memory in total).

Figure 9A:
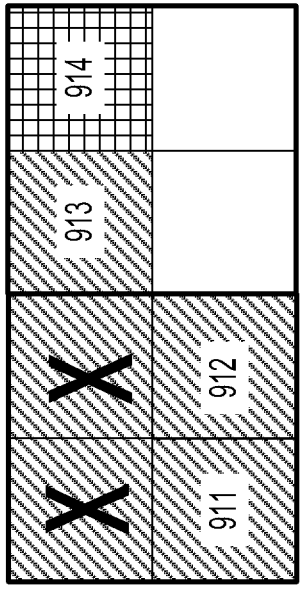
FIGS. 9A-9D show an example of intra picture block compensation with a one-CTU-size memory for storing reconstructed samples.
Figure 9B:
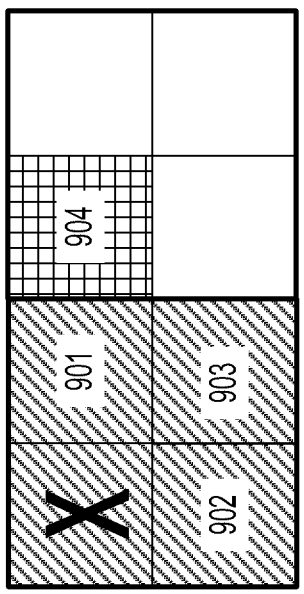
Figure 9C:
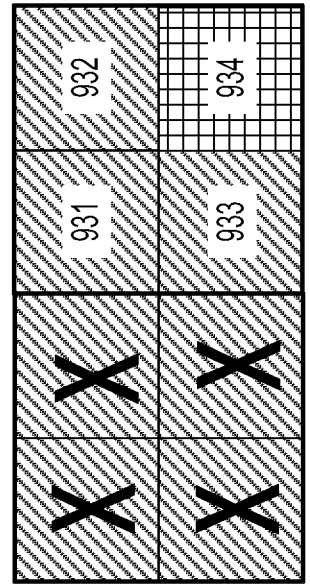
Figure 9D:
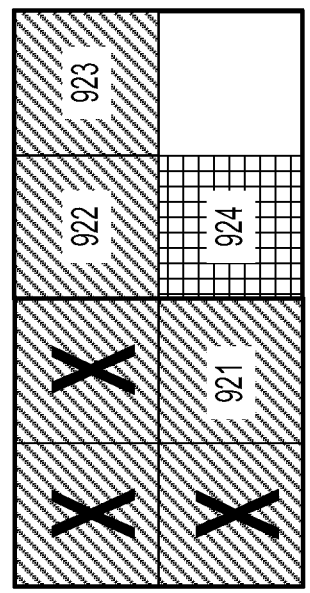

FIGS. 9A-9D show how the one-CTU-size memory is reused for searching a left CTU. FIGS. 9A-9D each show a left CTU and a right CTU having a size of 128×128 samples. Each CTU is partitioned into four 64×64 regions. In FIG. 9A, reconstructed regions (901-903) in the left CTU and a current region 904 under processing can be stored in the one-CTU-size memory. In FIG. 9B, two reconstructed regions (911-912) in the left CTU, one reconstructed region (913) in the current CTU, and a current region (914) can be stored in the one-CTU-size memory. In FIG. 9C, a reconstructed region (921) in the left CTU, two reconstructed regions (922-923) in the current CTU, and a current region 924 can be stored in the one-CTU-size memory. In FIG. 9D, three reconstructed regions (931-933) in the current CTU, and a current region 934 can be stored in the one-CTU-size memory.

In some embodiments, it is required that block vectors signaled in a bitstream follow a set of bitstream conformance conditions. As an example, a valid luma block vector denoted by mvL and in $\frac{1}{16}$-pel resolution should obey the following bitstream conformance conditions:

A1: When a derivation process for block availability is invoked with the current luma location (xCurr, yCurr) set equal to (xCb, yCb) and the neighboring luma location (xCb+(mvL[0]>>4), yCb+(mvL[1]>>4)) as inputs, the output shall be equal to TRUE (meaning already constructed thus available). The derivation process for block availability is also referred to as a neighboring blocks availability checking process. The condition A1 verifies that a top-left corner sample of a reference block at the location (xCb+(mvL[0]>>4), yCb+(mvL[1]>>4)) is available (already reconstructed).

A2: When the derivation process for block availability is invoked with the current luma location (xCurr, yCurr) set equal to (xCb, yCb) and the neighboring luma location (xCb+(mvL[0]>>4)+cbWidth−1, yCb+(mvL[1]>>4)+cbHeight−1) as inputs, the output shall be equal to TRUE. The condition A2 verifies that a bottom-right corner sample of a reference block at the location (xCb+(mvL[0]>>4)+cbWidth−1, yCb+(mvL[1]>>4)+cbHeight−1) is available.

B1: One or both the following conditions shall be true: The value of (mvL[0]>>4)+cbWidth is less than or equal to 0; and the value of (mvL[1]>>4)+cbHeight is less than or equal to 0. The condition B1 verifies that a reference block does not overlap a current block.

C1: The following conditions shall be true:

$$(yCb+(mvL[1]>>4))>>Ctb\ Log\ 2SizeY=yCb>>Ctb\ Log\ 2SizeY;$$

$$(yCb+(mvL[1]>>4)+cbHeight-1)>>Ctb\ Log\ 2SizeY=yCb>>Ctb\ Log\ 2SizeY;)$$

$$(xCb+(mvL[0]>>4))>>Ctb\ Log\ 2SizeY>=(xCb>>Ctb\ Log\ 2SizeY)-1;\ and$$

$$(xCb+(mvL[0]>>4)+cbWidth-1)>>Ctb\ Log\ 2SizeY<=(xCb>>Ctb\ Log\ 2SizeY).$$

The condition C1 verifies a reference block is located in a current CTU or a left CTU to the current CTU.

C2: When (xCb+(mvL[0]>>4))>>Ctb Log 2SizeY is equal to (xCb>>Ctb Log 2SizeY)−1, the derivation process for block availability is invoked with the current luma location(xCurr, yCurr) set equal to (xCb, yCb) and the neighboring luma location (((xCb+(mvL[0]>>4)+CtbSizeY)>>(Ctb Log 2SizeY−1))<<(Ctb Log 2SizeY−1), ((yCb+(mvL[1]>>4))>>(Ctb Log 2SizeY−1))<<(Ctb Log 2SizeY−1)) as inputs, the output shall be equal to FALSE (not constructed yet). The condition C2 verifies a reference region (e.g., the region (921) in FIG. 9C) in a left CTU corresponds to a region in a current CTU that is not constructed yet.

III. Spatial Merge Candidates of a Current Block

Figure 10:
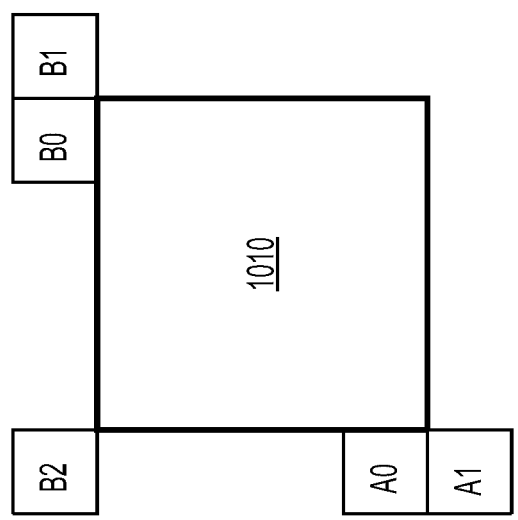
FIG. 10 shows an example of spatial merge candidates of a current block (1010).

FIG. 10 shows five spatial merge candidates of a current block (1010). The spatial merge candidates can be used for constructing a predictor list for block vector prediction of the current block (1010). For example, the current block (1010) is under construction with a skip mode, a merge mode, or a AMVP mode. A candidate list can be constructed. Candidates on the candidate list can be selected from spatial candidate positions A1, A0, B2, B0, and B1. In one example, availability of the spatial candidate positions are checked in the following order, A0, B0, B1, A1, and B2. When available, motion information at the candidate position can be added to the candidate list as a candidate. An index to the candidate list can be received in a bitstream. A candidate corresponding to the index can be used as a motion vector prediction (or predictor) to determine a motion vector of the current block 1010.

IV. History Based Motion Vector Prediction (HMVP)

In some example, a history based motion vector prediction (HMVP) scheme is used for coding a block. For example, HMVP merge candidates are added to a merge list after spatial motion vector prediction (SMVP) and temporal motion vector prediction (TMVP) candidates. In this method, motion information of a previously coded block is stored in a table (referred to as a HMVP table) and used as a motion vector predictor (MVP) for a current CU. The HMVP table with multiple HMVP candidates is maintained during an encoding or decoding process. The HMVP table is reset (emptied) when a new CTU row is encountered in some examples. Whenever there is a non-subblock inter-coded CU, the associated motion information is added to the last entry of the HMVP table as a new HMVP candidate in some examples.

In an embodiment, a HMVP table size S is set to be 6, which indicates up to 6 HMVP candidates may be added to the HMVP table. When inserting a new motion candidate to the HMVP table, a constrained first-in-first-out (FIFO) rule is utilized. A redundancy check is firstly applied to find whether there is an identical HMVP in the HMVP table. If found, the identical HMVP is removed from the table and all the HMVP candidates afterwards are moved forward.

HMVP candidates can be used in a merge candidate list construction process. In an example, the latest several HMVP candidates in the HMVP table are checked in order and inserted to the candidate list after TMVP candidates. Redundancy check is applied on the HMVP candidates against spatial or temporal merge candidates.

In an embodiment, to reduce the number of redundancy check operations, the following simplifications are introduced: (1) Number of HMVP candidates used for merge list generation is set as (N<=4)? M: (8−N), wherein N indicates number of existing candidates in the merge list and M indicates number of available HMVP candidates in the HMVP table. (2) Once the total number of available merge candidates reaches the maximally allowed merge candidates minus 1, the merge candidate list construction process from HMVP is terminated in an example.

V. HBVP Table Based Intra Block Copy (IBC)

In various embodiments, an IBC mode operates as a separate mode from inter mode (motion compensation from a picture different from a current picture). A separate history buffer, referred to as history-based block vector prediction (HBVP) buffer, is used for storing previously processed (encoded at an encoder side/decoded at a decoder side) IBC block vectors. When processing a current block coded with the IBC mode, either at an encoder side or a decoder side, a block vector of the current block can be determined based on the HBVP buffer. The HBVP buffer can also be referred to as an HBVP table or an HBVP list. In this detailed descriptions, HBVP buffer, HBVP table, and HBVP list are used interchangeably.

Embodiments described herein may be used separately or combined in any order. Further, each of methods (or embodiments), encoder, and decoder may be implemented by processing circuitry (e.g., one or more processors or one or more integrated circuits). In one example, the one or more processors execute a program that is stored in a non-transitory computer-readable medium. In the detailed descriptions, the term block may be interpreted as a prediction block, a coding block, or a coding unit (CU).

Embodiment A

When adding a block vector of an already processed block into an HBVP table, position (or location) information of the already processed block can be recorded in the HBVP table. In other words, for each entry in the HBVP table, in addition to block vector information, a location of a coded block (previously encoded or decoded block) which the block vector is associated with is also stored.

In an example, a redundancy check is not performed when adding a new block vector and associated location information to an HBVP table because each position of coded blocks is different. In another example, a redundancy check is performed when adding a new block vector and associated location information to an HBVP table. For example, the new block vector is compared with block vectors previously stored in the HBVP table. If a similar or identical old block vector is found, the old entry including the old block vector can be removed, and an entry including the new block vector and associated location information can be added to the HBVP table as a most recent candidate.

The location of a coded block can be represented by one of the four corners of the coded block in various examples. For example, x and y coordinates of a corner of the code block can be used to indicate the location. In an example, the location of a coded block is represented by a position of the bottom-right corner of the coded block. In another example, the location of a coded block can be represented by a position of the bottom-left corner of the coded block.

In an example, the location of a coded block can be represented by a position of one of the four corners of the coded block plus size (e.g., a width and a height) information of the coded block.

In an example, an HBVP table is reset (e.g., emptied) at the beginning of each CTU row. Under such a configuration, position information of entries in the HBVP table can each be recorded using a relative y offset from the respective CTU upper edge for the y coordinate of each respective coded block. In another embodiment, an HBVP table is reset at the beginning of each CTU. Accordingly, position information of entries in the HBVP can each be recorded using the relative x and y offsets from the respective CTU origin for the x and y coordinates of each respective coded block. In a further example, when recording x and y coordinates of an entry in the HBVP table, offsets from the respective CTU origin of the respective coded block are recorded irrelevant with the HBVP table reset operations.

Embodiment B

In some examples, a block vector prediction (BVP) candidate list is constructed based on an HBVP table. When selecting entries from the HBVP to be BVP candidates on the BVP candidate list, locations (or positions) of entries (referring to positions of coded blocks corresponding to respective entries) are considered.

In an example, a position of a current block and a position of an entry are compared. Position information of the entry is adjusted if the entry's position is in the bottom-right position of the current block. Based on the adjusted position information, the location relationship between the coded block and the current block can be determined.

For example, when calculating the relative position of the current block to one entry in the HBVP table, if both of the current block's x and y coordinates is smaller than the entry's x and y coordinates, respectively (meaning previously coded block is in the bottom-right position relative to the current block, which is impossible), an offset of (−CTU width, 0) is added to the entry's coordinates when performing the calculation. As a result, such an entry is moved to the left of the current block (meaning the respective block vector now is from the CTU to the left of current CTU).

In an example, an entry located to the left of a current block can be selected from an HBVP table and used as a block vector predictor (e.g., added to a BVP candidate list). For example, an entry in the HBVP table including an x coordinate corresponding to a top-left corner of a coded block. If the x coordinate is smaller than that of a top-left corner of the current block, it can be determined the entry (or the corresponding coded block) is located to the left of the current block.

Similarly, a block vector can be selected from an HBVP table that is on top of a current block. For example, an entry in the HBVP table including a y coordinate corresponding to a top-left corner of a coded block. If the y coordinate is smaller than that of a top-left corner of the current block, it can be determined the entry (or the corresponding coded block) is located on top of the current block.

Accordingly, in some examples, a BVP candidate list can be constructed based on entries selected from an HBVP table that are to the left or on top of a current block.

In some examples, a maximum number of 2*N predictors are adopted to predict a block vector of a current block (e.g., that are added to a BVP candidate list). In one example, N=1, then one of the 2*N predictors is from left positioned entries (referring to entries located to the left of the current block) in a HBVP table and the other one of the 2*N predictors is from top positioned entries (referring to entries located on top of the current block) in the HBVP able. In another example N=2, then the order of the predictors in the BVP candidate list may be, 1st left→1st top→2nd left→2nd top, assuming there are enough entries in the HBVP table. When there are no enough entries, the corresponding item in the predictor list (the BVP candidate list) can be empty and be filled up with a next item.

In some examples, started from the most recently coded entry in a HBVP table, a first entry that is to the left of a current block is selected as a left predictor. A next entry that is to the left of the current block is selected as a second left predictor. In this way, left predictors can be successively selected.

In some examples, started from the most recently coded entry in a HBVP table, a first entry that is on top of a current block can be selected as a first top predictor. A next entry that is on top of the current block can be selected as a second top predictor. In this way, top predictors can be successively selected.

In an example, a two-candidate predictor list (BVP candidate list) is constructed by scanning the first N HBVP entries in a HBVP table. The first N entries can be the most recently coded N entries or can be the most previously coded N entries in different examples. For example, N can be smaller than a size S of the HBVP table. The first entry to the left of a current block can be put as the first candidate in the predictor list. The first entry on top of the current block can be put as the 2nd candidate in the predictor list. If there are only top or only left candidates in the HBVP table, then the first two available entries cab be selected as the predictors.

Embodiment C

In some embodiments, a BVP candidate list (a predictor list) can be constructed in the following way. A block vector in a HBVP table is derived as a predictor if the block vector has an associated location next to the current block. For example, entries in the HBVP table can be scanned according to an order, for example, from the latest to the oldest. If an entry is next to the current block (the entry includes a location next to the current block), the block vector of this entry is put in the predictor list. This process can continue until a maximum number of candidates in the predictor list has reached. For example, in FIG. 10, the 5 spatial neighboring positions are considered to be next to the current block (1010). Entries in the HBVP table having locations corresponding to the five positions in FIG. 10 can be considered, and selected as candidates in the predictor list according to a certain order (e.g., A0, B0, B1, A1, and B2).

In an example, if a block vector in the HBVP buffer is not next to the current block, it may be put in the later positions in the predictor list after the spatial neighboring entries. In another example, if a block vector in the HBVP buffer is not next to current block, it may not be used in the predictor list.

Embodiment D

In some examples, when putting a block vector into a predictor list, a redundancy check can be performed to make sure the new predictor is different from other existing predictors in the predictor list.

Embodiment E

In various examples, a predictor list can be constructed based on an HBVP table, and used in a merge mode, a skip mode, or an AMVP mode (vector prediction with difference coding) for coding a block vector (block vector prediction) of a current block.

Embodiment F

In an embodiment, multiple HBVP tables can be maintained during a decoding process. Each HBVP table can be associated with a different criterion for taking a new coded block vector (a block vector of a previously decoded block). In this way, block vectors of coded blocks can be categorized into different groups and stored into the corresponding HBVP tables. When coding a current IBC-coded block, one or more block vectors can be selected from those separate HBVP tables and used as predictors for coding a block vector of the current block. Similarly, entries in those HBVP tables can each include a block vector of a coded block, a location (x and y coordinates) of the code block, a size (a width and a height) of the coded block, or other related information.

In a first example, the criterion for one of the HBVP tables taking a new block vector of a coded block is that the coded block satisfies a block size condition. A block size of the coded block can be measured in various ways. For example, the block size can be a number of luma samples in the coded block calculated by multiply a width with a height of the coded block. In an example, the block size condition is that the block size is larger than or equal to a threshold T_size1 and smaller than another threshold T_size2. In an example, the block size condition is that the block size is larger than or equal to a threshold.

In a second example, the criterion for one of the HBVP tables taking a new block vector of a coded block is that the coded block has a top-left corner's x coordinate xc satisfying the following condition: xc%ctuSizeY is greater than or equal to a threshold T_x0 and is smaller than another threshold T_x1. The symbol % denotes a modulo operation, and ctuSizeY represents a size of CTU.

In a third embodiment, the criterion for one of the HBVP tables taking a new block vector of a coded block is that the coded block has a top-left corner's y coordinate yc satisfying the following condition: yc%ctuSizeY is greater than or equal to a threshold T_y0 and is smaller than another threshold T_y1.

In a fourth example, the criterion for one of the HBVP tables taking a new block vector of a code block is that the coded block has a bottom-right corner's x coordinate xc satisfying the following condition: xc%ctuSizeY is greater than or equal to a threshold T_x0 and is smaller than another threshold T_x1.

In a fifth example, the criterion for one of the HBVP tables taking a new block vector of a coded block is that the coded block has a bottom-right corner's y coordinate yc satisfying the following condition: yc%ctuSizeY is greater than or equal to a threshold T_y0 and is smaller than another threshold T_y1.

In the above examples, a pruning process may be applied when putting a new block vector into an HBVP table. For example, when an entry in the HBVP table with the same block vector value as that of the new block vector is found, the entry may be removed. A new entry including the new block vector can be put in a position for storing an entry including a block vector of the most recently coded block.

Embodiment G

In an embodiment, one or more HBVP tables are maintained for block vector prediction of IBC-coded blocks. Each HBVP table is associated with a specific criterion for taking a new block vector. Assuming N HBVP tables in total are created and maintained. N is a positive integer number and is greater than or equal to 1.

In a first example, for each HBVP table that does not have any entries stored, a set of default block vector predictors are used to fill up the HBVP table. For example, a default block vector predictor can be a zero valued block vector (x and y coordinates being zero).

In a second example, an index pointing to one of the N HBVP tables can be received from a bitstream at a decoder. In response, an entry in the HBVP table indicated by the index can be selected for block vector prediction of a current block. For example, a most recent entry (a most recently added one) in the HBVP table indicated by the index can be selected as a block vector predictor of a current IBC-coded block. For another example, a least recent entry (a least recently coded one) in the HBVP table indicated by the index is selected as a block vector predictor of a current IBC-code block.

Embodiment H

In an embodiment, a single HBVP table, HBVP0, is maintained during a decoding process at a decoder. While decoding a current IBC-coded block, in order to determine a block vector predictor of the current block, entries in the HBVP0 are categorized into different groups. Each group is stored into a separate HBVP table that is referred to as a classification HBVP table. Each classification HBVP table can be assigned with a specific criterion for taking an entry from the HBVP0. The categorization operations can thus be based on those criteria.

For example, the HBVP0 can have a size of M. A number of the classification HBVP tables can be N that is smaller than or equal to M. The classification HBVP tables can be represented to be from HBVP1 to HBVPN.

For example, the criteria for categorizing newly coded block vectors as described in Embodiment F can be used for categorizing the entries of the HBVP0 into the tables from HBVP1 to HBVPN. Criteria different from that in Embodiment F can be employed in other examples. A pruning process may be applied when putting a new entry into the HBVPx table (x=0, 1, . . . , N). For example, when there is an old entry in the HBVPx with the same block vector value as that of the new entry, the old entry may be removed and the new one is put in a position for storing information of the most recently coded block.

In an example, after the tables of HBVP1 to HBVPN are generated, an entry can be selected from one of the tables of HBVP1 to HBVPN according to an index received from a bitstream. A block vector in the selected entry can be used as a block vector predictor of the current block.

In a first case, the index can indicate one of the tables of HBVP1 to HBVPN. In response to receiving the index, a latest entry (most recent entry) can be selected from the HBVP table indicated by the index.

In a second case, a predictor list can first be constructed by selecting entries from the tables of HBVP1 to HBVPN according to some rules (e.g., as described in Embodiment C). The index can indicate a candidate on the predictor list. In response to receiving the index, the candidate on the predictor list can be used as a block vector predictor of the current block.

VI. Examples of HBVP Table Based IBC Mode Decoding Process

Figure 11:
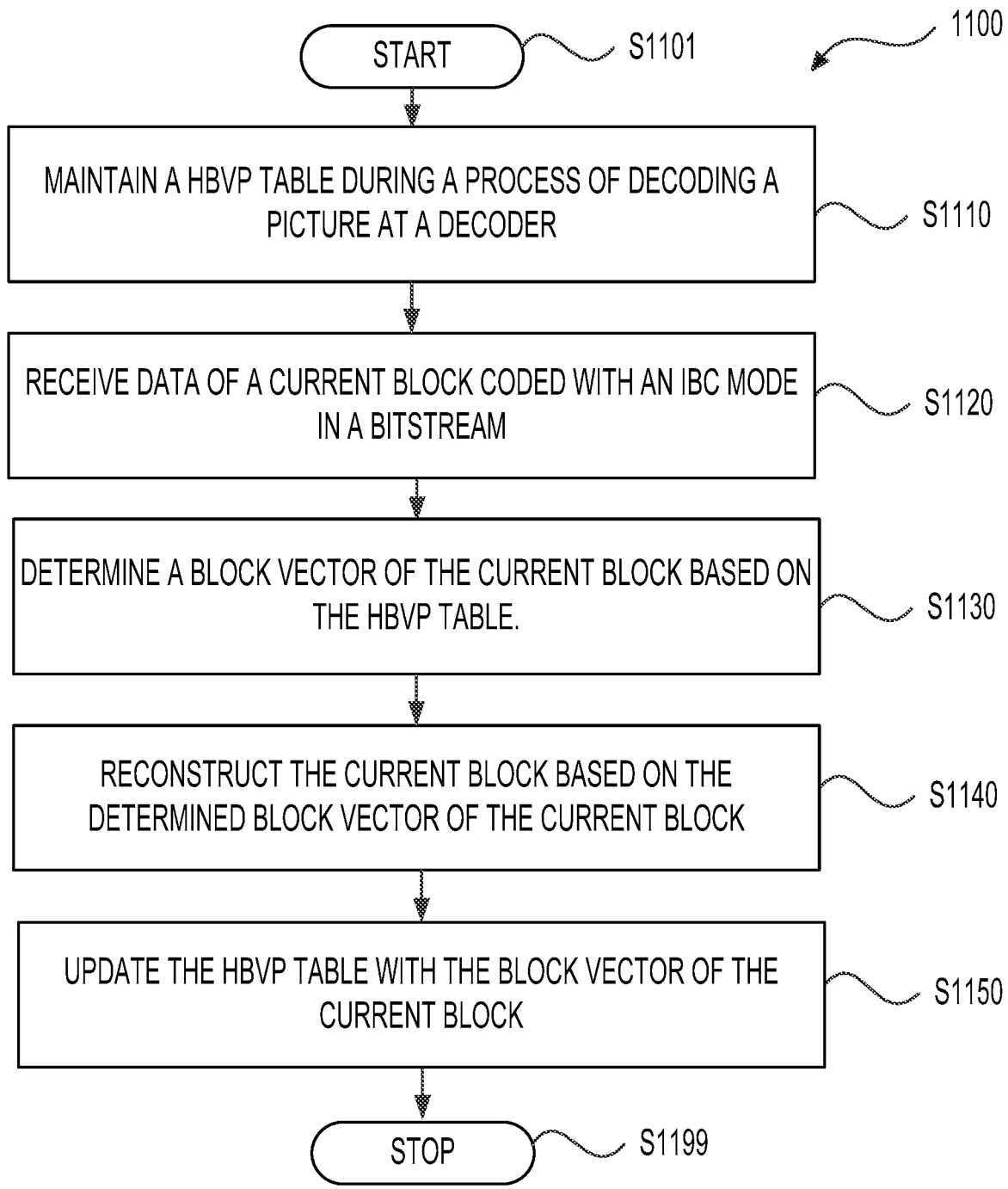
FIG. 11 shows a flow chart outlining a process (1100) according to some embodiments of the disclosure

FIG. 11 shows a flow chart outlining a process (1100) according to some embodiments of the disclosure. The process (1100) can be used in the reconstruction of an IBC-coded block, so to generate a prediction block for the block under reconstruction. In various embodiments, the process (1100) are executed by processing circuitry, such as the processing circuitry in the terminal devices (210), (220), (230) and (240), the processing circuitry that performs functions of the video decoder (310), the processing circuitry that performs functions of the video decoder (410), and the like. In some embodiments, the process (1100) is implemented in software instructions, thus when the processing circuitry executes the software instructions, the processing circuitry performs the process (1100). The process starts at (S1101) and proceeds to (S1110).

At (S1110), a HBVP table can be maintained during a process of decoding a picture at a decoder. For example, the HBVP table can include one or more entries each corresponding to a previously decoded IBC-coded block. Each entry can include a block vector of the corresponding previously decoded block and a location of the corresponding previously decoded block. The location can be an x coordinate and a y coordinate of one of four corners of the previously coded block. In an example, each entry can further include size information (e.g., a width and a height) of the respective previously decoded block.

At (S1120), data of a current block coded with an IBC mode can be received in a bitstream. For example, the data can include a set of block-level syntax elements corresponding to the current block. One of the syntax elements can indicate the current block is coded with the IBC mode.

At (S1130), a block vector of the current block can be determined based on the HBVP table. In order to determine the block vector of the current block, a block vector predictor of the block vector of the current block can first be determined.

In an example, a BVP candidate list can be constructed based on the HBVP table. A candidate is then selected from the BVP candidate list, for example, based on an index to the candidate on the BVP candidate list received in the bitstream. The selected candidate can include a block vector used as the block vector predictor. The BVP candidate list can include one or more of a first candidate and a second candidate. The first candidate can include a first block vector of the block vectors in the HBVP table. The corresponding previously decoded block of the first block vector has a location to the left of the current block. The second candidate can include a second block vector of the block vectors in the HBVP table. The corresponding previously decoded block of the second block vector can have a location on top of the current block.

In some examples, in order to determine the block vector predictor, the entries in the HBVP table are first classified into different groups each stored in a classification HBVP table. Each classification HBVP table can be associated with a criterion for taking a new entry. For example, one of the entries of the HBVP table is stored into one of the classification HBVP tables when a size of the corresponding previously decoded block of the one of the entries of the HBVP table satisfies a block size condition. For example, the block size condition can be that a number of luma samples of the corresponding previously decoded block of the one of the entries of the HBVP table is larger than or equal to a threshold.

For another example, the entries in the HBVP table can be classified into the classification HBVP tables based on an x coordinate, a y coordinate, or a combination of the x and y coordinates of each of the corresponding previously decoded blocks stored in the HBVP table. Accordingly, the entries of the coded blocks located at different positions with respect to the current block can be stored into different classification tables.

Based on the classification HBVP tables, the block vector predictor can be determined. In an example, an index indicating one of the classification HBVP tables can be received in the bit stream. Accordingly, one entry can be selected from the indicated classification HBVP tables. The selected entry can correspond to the most recently decoded block among the decoded blocks of the entries in the indicated classification HBVP tables. The block vector of the selected entry can be used as the block vector predictor of the block vector of the current block.

In another example, a BVP candidate list can be constructed based on the classification HBVP tables. The BVP candidate list can include one or more BVP candidates that each include a block vector selected from the classification HBVP tables. Subsequently, a BVP candidate can be selected from the BVP candidate list to be the block vector predictor of the block vector of the current block based on an index received from the bitstream.

After the block vector predictor is determined, the block vector of the current block can be determined accordingly. For example, the current block can be coded with the IBC mode in one of a skip mode, a merge mode, or an AMVP mode. For the skip mode and the merge mode, the block vector predictor can be used as the block vector of the current block. For the AMVP mode, a vector difference can be received in the bitstream, and added to the block vector predictor to form the block vector of the current block.

At (S1140), the current block can be reconstructed based on the determined block vector of the current block. For example, a reference block can be determined in the already decoded region of the picture based on the block vector, and combined with a residual of the current block to form a reconstructed block.

At (S1150), the HBVP table can be updated with the block vector of the current block. For example, the block vector of the current block, a location, a width, and a height of the current block can be stored in the HBVP table. A redundancy check may be performed when updating the HBVP table. The process (1100) can then proceed to (S1199), and terminate at (S1199).

VII. Computer System

The techniques described above, can be implemented as computer software using computer-readable instructions and physically stored in one or more computer-readable media.

Figure 12:
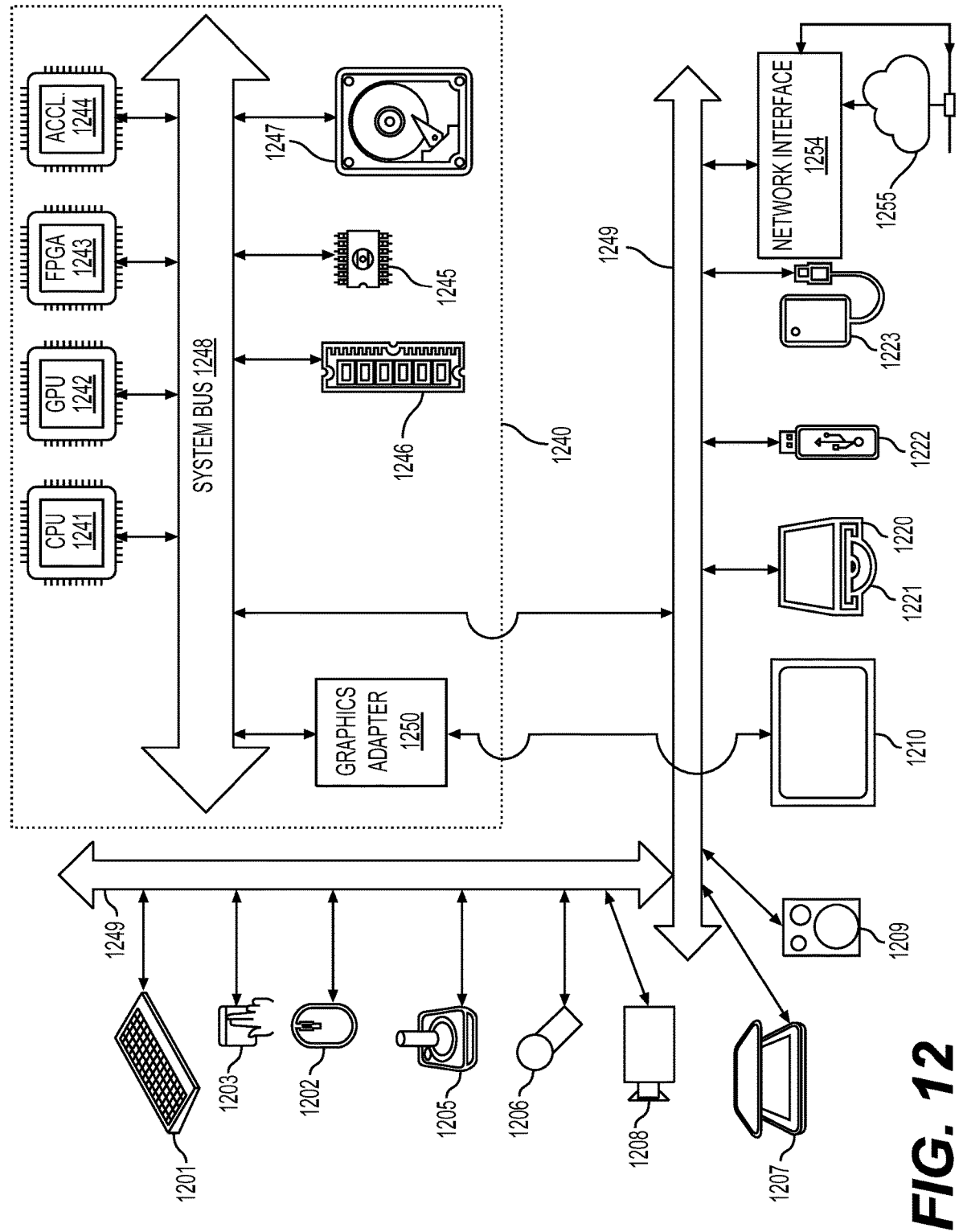
FIG. 12 is a schematic illustration of a computer system in accordance with an embodiment.

For example, FIG. 12 shows a computer system (1200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 12 for computer system (1200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1200).

Computer system (1200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1201), mouse (1202), trackpad (1203), touch screen (1210), data-glove (not shown), joystick (1205), microphone (1206), scanner (1207), camera (1208).

Computer system (1200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1210), data-glove (not shown), or joystick (1205), but there can also be tactile feedback devices that do not serve as input devices), audio output devices (such as: speakers (1209), headphones (not depicted)), visual output devices (such as screens (1210) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1200) can also include human accessible storage devices and their associated media such as optical media including CD/DVD ROM/RW (1220) with CD/DVD or the like media (1221), thumb-drive (1222), removable hard drive or solid state drive (1223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1200) can also include an interface (1254) to one or more communication networks (1255). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1249) (such as, for example USB ports of the computer system (1200)); others are commonly integrated into the core of the computer system (1200) by attachment to a system bus as described below (for example Ethernet interface into a PC computer system or cellular network interface into a smartphone computer system). Using any of these networks, computer system (1200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1240) of the computer system (1200).

The core (1240) can include one or more Central Processing Units (CPU) (1241), Graphics Processing Units (GPU) (1242), specialized programmable processing units in the form of Field Programmable Gate Areas (FPGA) (1243), hardware accelerators for certain tasks (1244), graphics adapter (1250), and so forth. These devices, along with Read-only memory (ROM) (1245), Random-access memory (1246), internal mass storage such as internal non-user accessible hard drives, SSDs, and the like (1247), may be connected through a system bus (1248). In some computer systems, the system bus (1248) can be accessible in the form of one or more physical plugs to enable extensions by additional CPUs, GPU, and the like. The peripheral devices can be attached either directly to the core's system bus (1248), or through a peripheral bus (1249). In FIG. 12, the screen (1210) is connected to the graphics adapter (1250). Architectures for a peripheral bus include PCI, USB, and the like.

CPUs (1241), GPUs (1242), FPGAs (1243), and accelerators (1244) can execute certain instructions that, in combination, can make up the aforementioned computer code. That computer code can be stored in ROM (1245) or RAM (1246). Transitional data can be also be stored in RAM (1246), whereas permanent data can be stored for example, in the internal mass storage (1247). Fast storage and retrieve to any of the memory devices can be enabled through the use of cache memory, that can be closely associated with one or more CPU (1241), GPU (1242), mass storage (1247), ROM (1245), RAM (1246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1200), and specifically the core (1240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1240) that are of non-transitory nature, such as core-internal mass storage (1247) or ROM (1245). The software implementing various embodiments of the present disclosure can be stored in such devices and executed by core (1240). A computer-readable medium can include one or more memory devices or chips, according to particular needs. The software can cause the core (1240) and specifically the processors therein (including CPU, GPU, FPGA, and the like) to execute particular processes or particular parts of particular processes described herein, including defining data structures stored in RAM (1246) and modifying such data structures according to the processes defined by the software. In addition or as an alternative, the computer system can provide functionality as a result of logic hardwired or otherwise embodied in a circuit (for example: accelerator (1244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

AMVP: Advanced Motion Vector Prediction
ASIC: Application-Specific Integrated Circuit
BMS: benchmark set
BV: Block Vector
CANBus: Controller Area Network Bus
CD: Compact Disc
CPR: Current Picture Referencing
CPUs: Central Processing Units
CRT: Cathode Ray Tube
CTBs: Coding Tree Blocks
CTU: Coding Tree Unit
CU: Coding Unit
DPB: Decoded Picture Buffer
DVD: Digital Video Disc
FIFO: First-in-First-out
FPGA: Field Programmable Gate Areas
GOPs: Groups of Pictures
GPUs: Graphics Processing Units
GSM: Global System for Mobile communications
HBVP: History-based Block Vector Prediction
HEVC SCC: HEVC screen content coding
HEVC: High Efficiency Video Coding
HMVP: History-based Motion Vector Prediction
HRD: Hypothetical Reference Decoder
IBC: Intra Block Copy
IC: Integrated Circuit
JEM: joint exploration model
LAN: Local Area Network
LCD: Liquid-Crystal Display
LTE: Long-Term Evolution
MV: Motion Vector
MVP: Motion vector predictor
OLED: Organic Light-Emitting Diode
PBs: Prediction Blocks
PCI: Peripheral Component Interconnect
PLD: Programmable Logic Device
PUs: Prediction Units
RAM: Random Access Memory
ROM: Read-Only Memory
SEI: Supplementary Enhancement Information
SNR: Signal Noise Ratio
SSD: solid-state drive
TMVP: Temporal Motion Vector Prediction
TUs: Transform Units,
USB: Universal Serial Bus
VTM: VVC test model
VUI: Video Usability Information
VVC: versatile video coding While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method of video decoding at a video decoder, comprising:
receiving data of a current block coded with an intra block copy (IBC) mode in a bitstream:
classifying entries in a history-based block vector prediction (HBVP) table into different groups that are each stored in a classification HBVP table, each entry corresponding to a previously decoded block, each entry including a block vector of the corresponding previously decoded block and size information and a location of the corresponding previously decoded block, the size information being represented by a width and a height of the corresponding previously decoded block, the classifying being based on the size information of the corresponding previously decoded block included in each entry of the HBVP table and based on the location of the corresponding previously decoded block included in each entry of the HBVP table;
determining a block vector of the current block based on the classification HBVP tables; and
reconstructing the current block based on the determined block vector of the current block.

2. The method of claim 1, further comprising:
storing the block vector, a location, a width, and a height of the current block in the HBVP table.

3. The method of claim 1, wherein the classifying the entries in the HBVP table into different groups each stored in the respective classification HBVP table further includes:
storing one of the entries of the HBVP table into one of the classification HBVP tables when a size of the corresponding previously decoded block of the one of the entries of the HBVP table satisfies a block size condition.

4. The method of claim 3, wherein the block size condition is satisfied when a number of lama samples of the corresponding previously decoded block of the one of the entries of the HBVP table is larger than or equal to a threshold.

5. The method of claim 1, wherein the classifying the entries in the HBVP table into different groups each stored in the respective classification HBVP table further includes:
classifying the entries in the HBVP table into the classification HBVP tables based on an x coordinate, a y coordinate, or a combination of the x and y coordinates of each of the corresponding previously decoded blocks stored in the HBVP table.

6. The method of claim 1, wherein the determining the block vector of the current block based on the classification HBVP tables further includes:
receiving an index indicating one of the classification HBVP tables; and
selecting one entry from the indicated classification HBVP tables, the selected one entry corresponding to a most recently decoded block among the previously decoded blocks of the one or more entries in the indicated classification HBVP tables, a block vector of the selected one entry being used as a block vector predictor of the block vector of the current block.

7. The method of claim 1, the determining the block vector of the current block based on the classification HBVP tables further includes:
constructing a block vector prediction (BVP) candidate list including one or more BVP candidates that each include a block vector selected from the classification HBVP tables; and
selecting a BVP candidate from the BVP candidate list to be a block vector predictor of the block vector of the current block based on an index received from the bitstream.

8. An apparatus of video decoding, comprising circuitry configured to:
receive data of a current block coded with an intra block copy (IBC) mode in a bitstream;
classify entries in a history-based block vector prediction (HBVP) table into different groups that are each stored in a classification HBVP table, each entry corresponding to a previously decoded block, each entry including a block vector of the corresponding previously decoded block and size information and a location of the corresponding previously decoded block, the size information being represented by a width and a height of the corresponding previously decoded block, the classification being based on the size information of the corresponding previously decoded block included in each entry of the HBVP table and based on the location of the corresponding previously decoded block included in each entry of the HBVP table;
determine a block vector of the current block based on the classification HBVP tables; and
reconstruct the current block based on the determined block vector of the current block.

9. The apparatus of claim 8, wherein the circuitry is further configured to:
store the block vector, a location, a width, and a height of the current block in the HBVP table.

10. The apparatus of claim 8, wherein the circuitry is further configured to:
store one of the entries of the HBVP table into one of the classification HBVP tables when a size of the corresponding previously decoded block of the one of the entries of the HBVP table satisfies a block size condition.

11. The apparatus of claim 10, wherein the block size condition is satisfied when a number of luma samples of the corresponding previously decoded block of the one of the entries of the HBVP table is larger than or equal to a threshold.

12. The apparatus of claim 8, wherein the circuitry is further configured to:
classify the entries in the HBVP table into the classification HBVP tables based on an x coordinate, a y coordinate, or a combination of the x and y coordinates of each of the corresponding previously decoded blocks stored in the HBVP table.

13. The apparatus of claim 8, wherein the circuitry is further configured to:
receive an index indicating one of the classification HBVP tables; and
select one entry from the indicated classification HBVP tables, the selected one entry corresponding to a most recently decoded block among the previously decoded blocks of the one or more entries in the indicated classification HBVP tables, a block vector of the selected one entry being used as a block vector predictor of the block vector of the current block.

14. The apparatus of claim 8, wherein the circuitry is further configured to:
construct a block vector prediction (BVP) candidate list including one or more BVP candidates that each include a block vector selected from the classification HBVP tables; and
select a BVP candidate from the BVP candidate list to be a block vector predictor of the block vector of the current block based on an index received from the bitstream.

15. A non-transitory computer-readable medium storing instructions that, when executed by a processor, cause the processor to perform a method of video decoding, the method comprising:
receiving data of a current block coded with an intra block copy (IBC) mode in a bitstream;
classifying entries in a history-based block vector prediction (HBVP) table into different groups that are each stored in a classification HBVP table, each entry corresponding to a previously decoded block, each entry including a block vector of the corresponding previously decoded block and size information and a location of the corresponding previously decoded block, the size information being represented by a width and a height of the corresponding previously decoded block, the classifying being based on the size information of the corresponding previously decoded block included in each entry of the HBVP table and based on the location of the corresponding previously decoded block included in each entry of the HBVP table;
determining a block vector of the current block based on the classification HBVP tables; and
reconstructing the current block based on the determined block vector of the current block.

16. The non-transitory computer-readable medium of claim 15, wherein the method further comprising:
storing the block vector, a location, a width, and a height of the current block in the HBVP table.

17. The non-transitory computer-readable medium of claim 15, wherein the classifying the entries in the HBVP table into different groups each stored in the respective classification HBVP table further includes:
storing one of the entries of the HBVP table into one of the classification HBVP tables when a size of the corresponding previously decoded block of the one of the entries of the HBVP table satisfies a block size condition.

18. The non-transitory computer-readable medium of claim 17, wherein the block size condition is satisfied when a number of luma samples of the corresponding previously decoded block of the one of the entries of the HBVP table is larger than or equal to a threshold.

19. The non-transitory computer-readable medium of claim 15, wherein the classifying the entries in the HBVP table into different groups each stored in the respective classification HBVP table further includes:
  classifying the entries in the HBVP table into the classification HBVP tables based on an x coordinate, a y coordinate, or a combination of the x and y coordinates of each of the corresponding previously decoded blocks stored in the HBVP table.

20. The non-transitory computer-readable medium of claim 15, wherein the determining the block vector of the current block based on the classification HBVP tables further includes:
  receiving an index indicating one of the classification HBVP tables; and
  selecting one entry from the indicated classification HBVP tables, the selected one entry corresponding to a most recently decoded block among the previously decoded blocks of the one or more entries in the indicated classification HBVP tables, a block vector of the selected one entry being used as a block vector predictor of the block vector of the current block.

* * * * *